United States Patent [19]
Reichert

[11] Patent Number: 4,765,435
[45] Date of Patent: Aug. 23, 1988

[54] MOBILE WELL-LOGGING LABORATORY

[75] Inventor: Volker L. Reichert, Missouri City, Tex.

[73] Assignee: Schlumberger Technology Corporation, Houston, Tex.

[21] Appl. No.: 762,999

[22] Filed: Aug. 6, 1985

[51] Int. Cl.⁴ .......................... G01V 1/40; G01V 1/00; E21B 33/00; B62D 21/00
[52] U.S. Cl. ..................................... 181/102; 367/191; 73/151; 166/75.1; 175/170; 175/195; 254/323; 280/1; 180/311
[58] Field of Search ............... 181/101, 102, 103, 108, 181/109, 113, 114, 110, 111, 112, 122.5; 364/421, 422; 340/851; 367/25, 68, 20, 69, 15, 13, 86, 140, 189, 190; 166/911, 912, 75.1, 79, 85, 267, 336, 351, 356, 357, 901; 175/1, 5, 40, 86, 87, 161, 219, 170, 195; 173/22, 29; 73/1 R, 151, 432 A, 432 AD, 571; 180/20, 167, 168, 169, 182, 89.11, 89.13, 317, 320, 321, 322, 326, 333, 53.1, 53.8, 311; 280/11.27, 11.28, 12 R, 480, 490 R, 42, 1; 52/143, 79.7, 79.11; 105/161, 454; 114/253, 254; 254/266, 279, 288, 323, 329, 331, 90, DIG. 9, 4 R, 4 C

[56] References Cited
U.S. PATENT DOCUMENTS

| | | | |
|---|---|---|---|
| 3,023,808 | 3/1962 | St. John | 166/79 |
| 3,080,987 | 3/1963 | Jacquemond | 180/324 |
| 3,256,479 | 6/1966 | Edwards | 367/14 X |
| 3,340,655 | 9/1967 | Darrah, Jr. | 52/143 |
| 3,401,660 | 9/1968 | Strange et al. | 367/15 X |
| 3,453,790 | 7/1969 | Harris | 52/143 |
| 3,829,064 | 8/1974 | Jackson | 254/323 |
| 3,973,754 | 8/1976 | Chadwick, Jr. | 254/323 |
| 4,007,782 | 2/1977 | Nybo et al. | 166/79 |
| 4,016,951 | 4/1977 | Dick et al. | 181/113 |
| 4,139,074 | 2/1979 | White | 181/114 |
| 4,372,420 | 2/1983 | White | 181/114 |
| 4,410,039 | 10/1983 | DeWald | 52/79.7 |
| 4,605,089 | 8/1986 | Kravchenko et al. | 367/189 |

FOREIGN PATENT DOCUMENTS 1117549 10/1984 U.S.S.R. ............... 181/114

OTHER PUBLICATIONS

Publication, The Cyber Service Unit, An Integrated Logging System, Eaton et al., Schlumberger Well Services, SPE of AIME 1976, pp. 1-9.
Advertising material (published prior to filing date of this application).

Primary Examiner—Deborah L. Kyle
Assistant Examiner—Brian S. Steinberger
Attorney, Agent, or Firm—Henry N. Garrana; Mary M. Yawney; Ben Tobor

[57] ABSTRACT

A well-logging laboratory, for use with a well-logging tool which is suspended within a borehole by a wireline, includes a moveable frame upon which the wireless drum is mounted, and a moveable bulkhead is associated with the frame and various well-logging apparatus can be secured to the bulkhead, whereby the frame and bulkhead may be assembled as a modular unit, and moved within the well-logging laboratory as a modular unit.

24 Claims, 6 Drawing Sheets

MOBILE WELL-LOGGING LABORATORY

FIELD OF THE INVENTION

The invention relates to a mobile well-logging laboratory for use with a well-logging tool which is suspended within a borehole by a wireline.

DESCRIPTION OF THE PRIOR ART

Well-logging instrumentation is typically used to determine various physical parameters of formations adjacent a borehole, and such instrumentation is typically lowered to the bottom of the borehole on an armored electrical cable, or wireline. As the well-logging instrumentation, or well-logging tools, are pulled upwardly out of the borehole, they typically measure the depth and physical properties of the various formations adjacent the borehole. The measurements obtained from the well-logging tool are transmitted via the wireline to appropriate equipment, such as a computer and data recorders, wherein the information is recorded on magnetic tape. A graph, or log, is then produced, which log is representative of the information obtained. It is not uncommon for such well-logging tools to be suspended by the wireline in a borehole which is 15,000 feet deep, and thus 15,000 feet of wireline may be disposed about a rotatable drum which is used to raise or lower the wireline-suspended well-logging tools, and upon which drum the wireline is stored.

Prior to the development of the present invention, the equipment, necessary for performing well-logging operations in a borehole disposed in the earth's surface, is transported to the site of the borehole by placing the equipment in a customized truck body. Typically, the equipment includes: a large rotatable drum having the desired length of wireline disposed thereon; a power source for rotating the drum; suitable controls for operating the drum and related equipment; and a computer and data recorders, for preparation of the desired log. The drum, wireline, and related equipment, are fixedly secured at the rear end of the truck so that the wireline may be passed into the borehole in a conventional manner. Between the cab of the truck and the drum, wireline, and related equipment, is disposed the computer, data recorders, and drum operation controls. While the wireline-suspended logging tools are being lowered or raised within the borehole, and during the performance of well-logging operations, various individuals must be within the truck to operate the controls, computer and data recorders. Further, it should be noted that because of the sensitivity of the computer to variations in temperature, as well as the fact that the computer and related equipment generate heat during their operation, it is necessary that the space within the truck, wherein the computer, data recorders and related equipment are disposed, must be maintained within a predetermined temperature range, so as not to damage the equipment. Accordingly, the space within the truck wherein such equipment is located, must be provided with some type of air conditioning equipment to insure that the temperature within the truck where the computer is disposed does not rise above a certain temperature level, so as to not have the equipment, and in particular, the computer, damaged. The computer, data recordings, drum controls, and related equipment are fixedly secured within the air conditioned portion of the truck.

Insofar as the equipment disposed in the rear of the truck and in particular the drum having the wireline disposed thereon, is much heavier than the computer, data recorders, drum controls, and related equipment disposed between the drum and the cab of the truck, the weight distribution along the truck body is not evenly balanced. Accordingly, it is typically necessary to utilize a tandem axle at the rear of the truck to support the great weight of the drum and wireline which is disposed at the rear of the truck body. The great weight of the drum and wireline, because of its location at the rear of the truck, requires extensive, expensive customization of a commercially available truck, in order to accomodate the weight and its location in the truck.

Another disadvantage with the prior art mobile well-logging laboratory disposed within a truck body is that the space wherein the operators of the equipment work, or logging instrument cabin, is typically too small for the number of people which must be present in the logging instrument cabin during well-logging operations. Further, it is frequently necessary to have the mobile well-logging laboratory truck accompanied by another vehicle to bring additional equipment, such as well pressure control equipment, to the borehole site, in that there is not sufficient space to store the additional equipment. Another disadvantage associated with the present mobile well-logging laboratory mounted within a truck body is that if only one component of the equipment were to require a repair or maintenance service, the entire truck and all the other components of the equipment must remain idle while the necessary repair and/or maintenance service is performed.

When well-logging operations are performed at an offshore location for a borehole disposed beneath a body of water, such as from an offshore platform, drilling barge, etc., the mobile well-logging laboratory requires the presence of two structures, or cabins, on the offshore structure: one cabin having the drum fixedly secured therein, and another cabin used to store the well-logging tools and related equipment. Inofar as space is at a premium on an offshore structure, such as an offshore platform, the necessity for two cabins forming a well-logging laboratory on the offshore structure, is a distinct disadvatage. Furthermore, it is typically necessary to transport the well-logging laboratory to the offshore structure and assemble it there piece by piece, which can sometimes be not only a difficult task to accomplish at an offshore location, but an expensive task as well.

Accordingly, prior to the development of the present invention, there has been no mobile well-logging laboratory which: has evenly distributed weight when being transported and mounted upon a truck; has sufficient room within the instrument cabin; is easy to repair; has sufficient storage space for all the equipment utilized in well-logging operations; is economical to manufacture and repair; and is readily assembled on an offshore structure and does not require two cabins to be disposed upon the offshore structure. Therefore, the art has sought a mobile well-logging laboratory which: has more even weight distribution when the laboratory is being transported via truck; has sufficient instrument cabin space for the operators to work in; is easy to repair and does not require the entire laboratory and truck to be idled while such repairs or maintenance services are performed; provides adequate storage space for all the necessary equipment for well-logging operations; is economical to manufacture and repair; and is readily assembled at an offshore location and does not require two cabins to be used on the offshore structure for the well-logging laboratory.

SUMMARY OF THE INVENTION

In accordance with the present invention, the foregoing advantages have been achieved through the present well-logging laboratory, for use with a well-logging tool which is suspended within a borehole by a wireline. The present invenion may include: a support surface; an outer shell associated with the support surface; a frame associated with the support surface and disposed within the outer shell; a drum mounted to the frame and disposed within the outer shell, the drum being adapted for having the wireline disposed thereon and adapted for raising or lowering the wireline within the borehole; and means for moving the frame with respect to the support surface and within the outer shell, whereby the drum is moveable upon the support surface along at least a portion of the length of the support surface. A feature of the present invention resides in the fact that the frame moving means may include at least one rail associated with the support surface and the frame, and the frame moving means may also include at least one roller associated with the rail.

A further feature of the present invention is that the frame may include at least one first frame member disposed substantially parallel with respect to the support surface, and the drum is mounted to the at least one parallel first frame member. Another feature of the present invention is that the frame may include at least one second frame member disposed substantially perpendicular to the support surface and within the outer shell.

Another feature of the present invention is that the at least one second perpendicular frame member may comprise a bulkhead associated with the at least one parallel first frame member; the bulkhead being adapted to divide the area within the outer shell into a first and a second compartment, the size of each compartment being determined by the location of the bulkhead within the outer shell, upon relative movement of the bulkhead with respect to the support surface.

A further feature of the present invention is that the drum may be disposed within the second compartment defined by the bulkead, and a computer for use with the well-logging tool may be disposed within the first compartment defined by the bulkhead. An additional feature of the present invention is that the computer may be attached to the bulkhead and moveable therewith, whereby upon movement of the frame with respect to the support surface, the drum and computer simultaneously move with the frame.

The well-logging laboratory of the present invention, when compared with previously proposed prior art well-logging laboratories, has the advantages of: provides more even weight distribution during transport of the laboratory by truck; provides sufficient space within the instrument cabin during well-logging operations; provides modular construction of major components so that it is easy, economical, and efficient to assemble and repair; provides readily accessible storage space for all necessary equipment for well-logging operations; and does not require a second structure to be disposed at an offshore location.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 4:
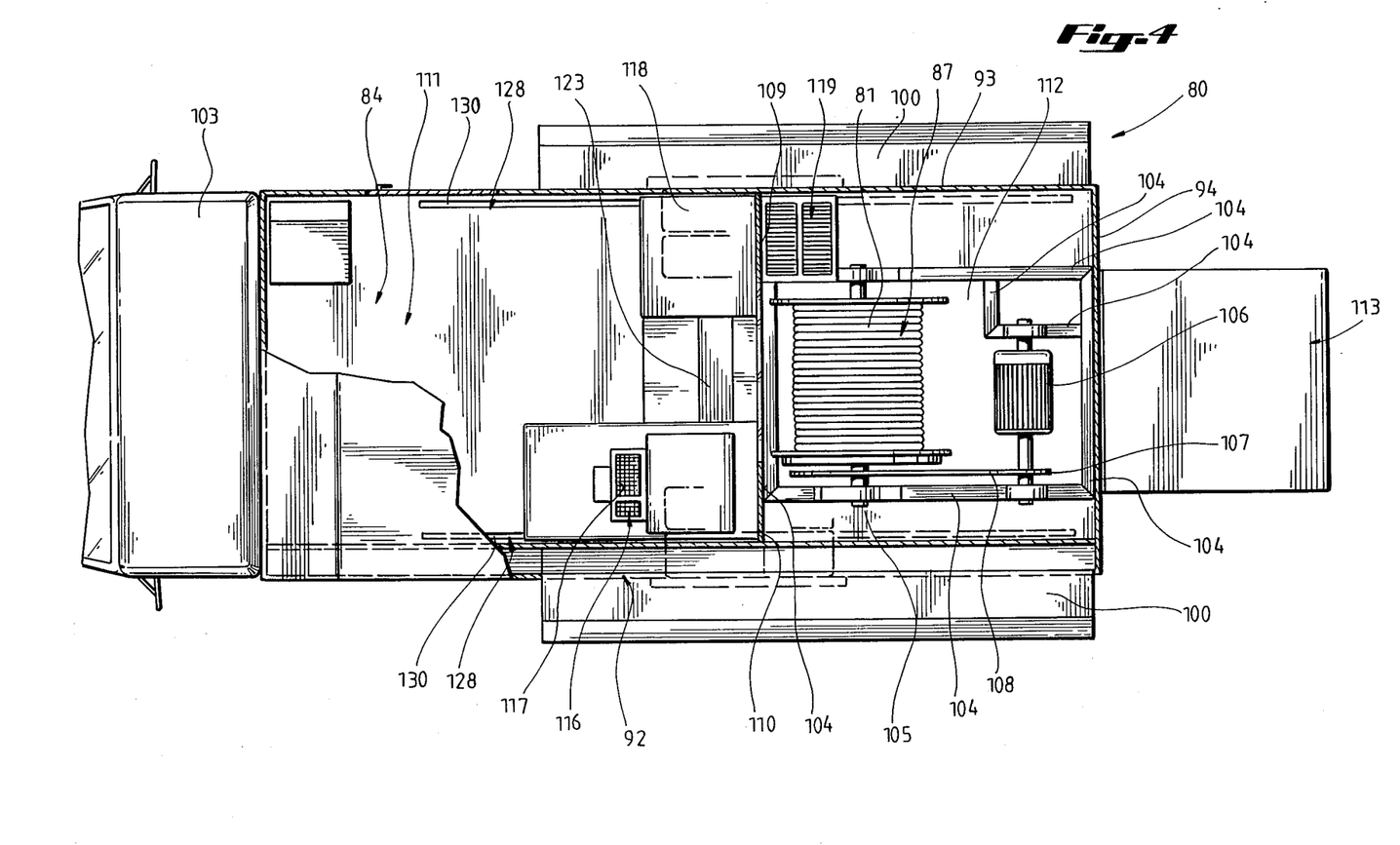
FIG. 4 is a top, plan view of the well-logging laboratory of FIG. 3.
Figure 5:
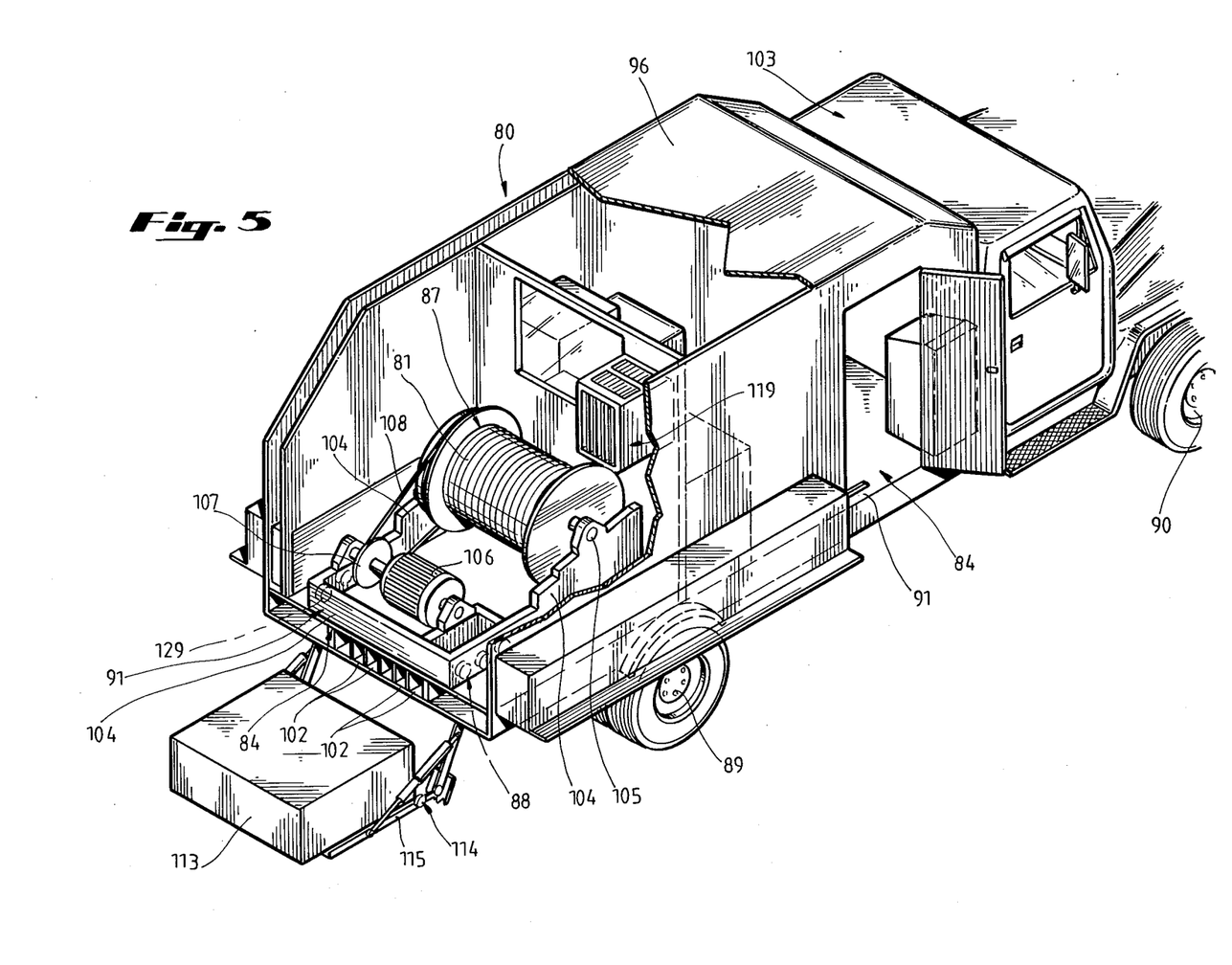
FIG. 5 is a partial, cut-away, perspective view of the well-logging laboratory of FIGS. 3 and 4, taken from the rear.
Figure 6:
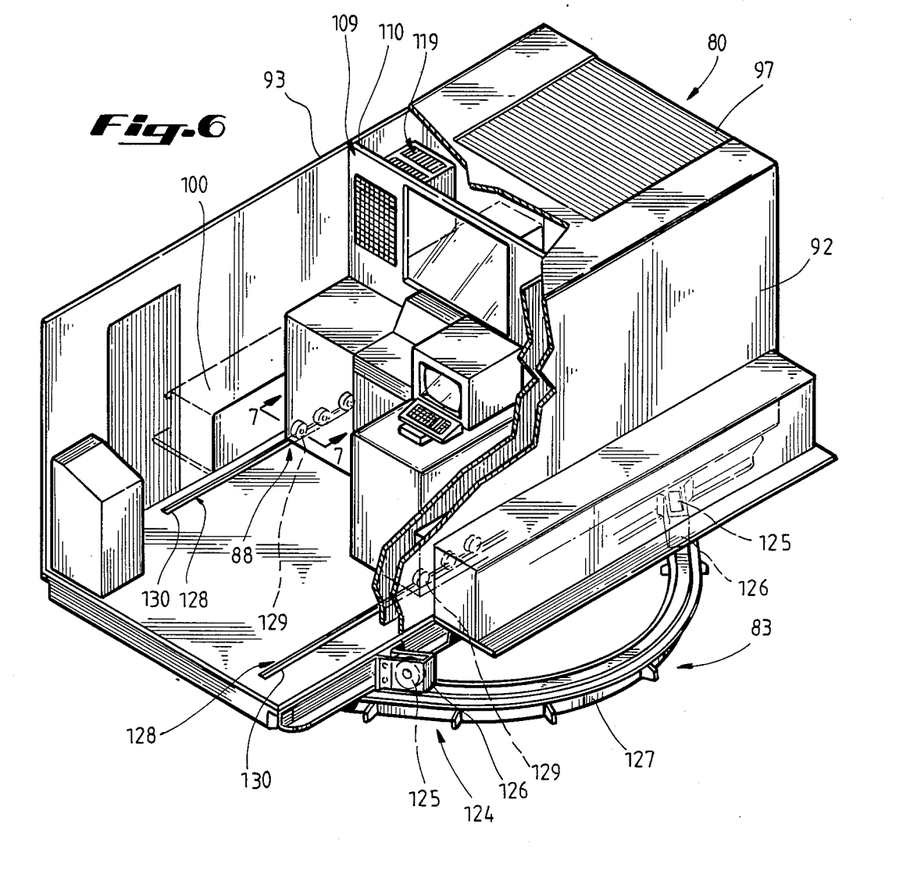
FIG. 6 is a partial, cut-away, perspective view of a well-logging laboratory in accordance with the present invention for use on an offshore structure.

In FIGS. 1-6 a well-logging laboratory 80 for use with a well-logging tool (not shown) which is suspended within a borehole (not shown) by a wireline 81 is illustrated. The embodiment of well-logging laboratory 80 shown in FIGS. 1-5 is shown as being mounted upon a truck 82, whereas the embodiment of well-logging laboratory 80 shown in FIG. 6 is mounted upon an offshore structure 83, such as an offshore platform, or drilling barge, which offshore structure is associated with a borehole (not shown) disposed beneath a body of water (not shown). Throughout the Figures, like reference numerals will be utilized for elements having the same construction.

Figure 1:
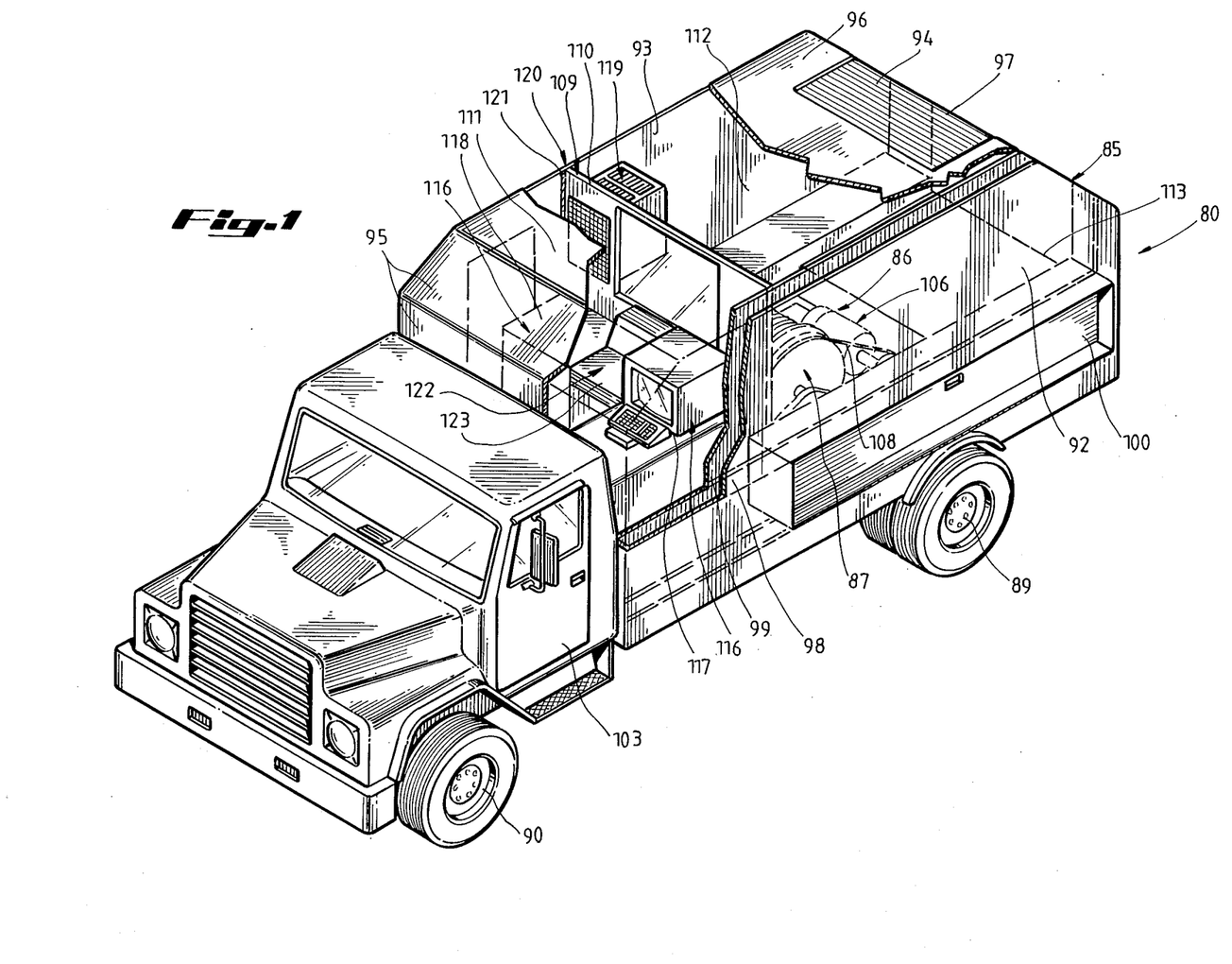
FIG. 1 is a partial, cut-away, perspective view of a well-logging laboratory, in accordance with the present invention, shown disposed upon a truck, with the components of the laboratory being disposed in their transport position.
Figure 2:
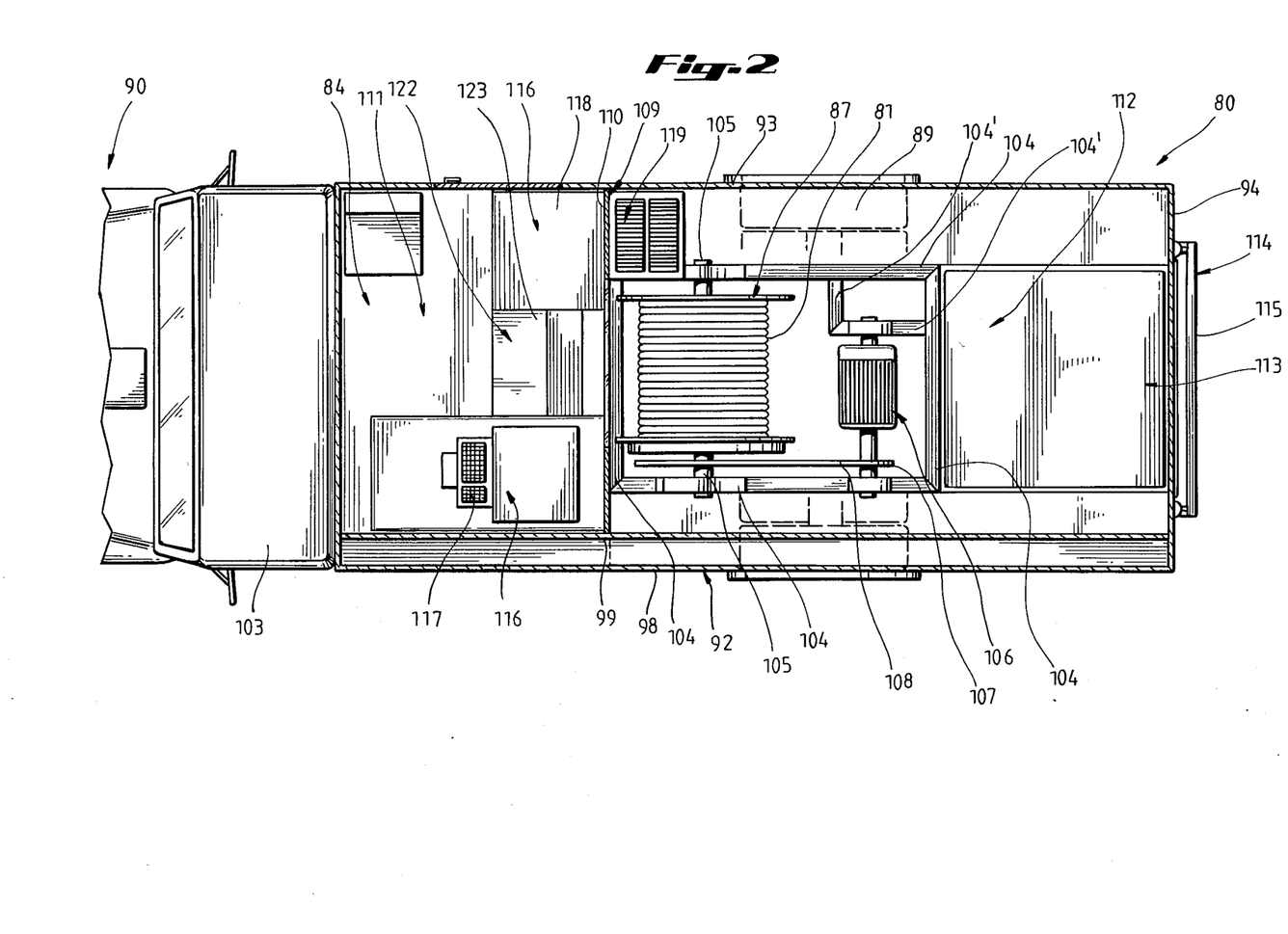
FIG. 2 is a top, plan view of the well-logging laboratory of FIG. 1, in accordance with the present invention.

With reference now to FIGS. 1-4, it is seen that well-logging laboratory 80 generally comprises: a support surface 84; an outer shell 85 associated with the support surface 84; a frame 86 associated with the support surface 84 and disposed within the outer shell 85; a drum 87 mounted to the frame 86 and disposed within the outer shell 85, the drum being adapted for having the wireline 81 disposed thereon and adapted for raising or lowering the wireline 81 within a borehole (not shown); and means for moving 88 (FIGS. 5, 6, and 7) the frame 86 with respect to the support surface 84 and within the outer shell 85, whereby the drum 87 is moveable upon the support surface 84 along at least a portion of the length of the support surface 84. FIGS. 1 and 2 illustrate drum 87 and frame 86 being disposed within outer shell 85 in a first position, wherein the well-logging laboratory 80 is being transported to the borehole site (not shown) via a means for moving the well-logging laboratory 80, or truck 82. As seen in FIGS. 1 and 2, drum 87 is disposed adjacent the rear truck axle 89, and between rear axle 89 and front truck axle 90. Accordingly, during transportation of well-logging laboratory 80, the heavy weight of drum 87 is more evenly distributed along the length of truck 82. Specifically, drum 87 is disposed between the front and rear axles 89, 90 of truck 82, whereby truck 82 should travel in a smoother manner, as it is being utilized to transport well-logging laboratory 80 to its destination. Furthermore, it is believed that the smoother ride will also decrease the transmission of vibrational forces to the equipment, to be hereinafter described in greater detail, contained within well-logging laboratory 80. With the exception of a truck 82 to be utilized for extremely rough terrain, truck 82 may utilize only a single rear axle 89, whereby significant cost savings can be achieved when purchasing truck 82 to transport well-logging laboratory 80. It is believed that for rough terrain useage, a tandem rear axle (not shown) would be desired and/or required.

Figure 3:
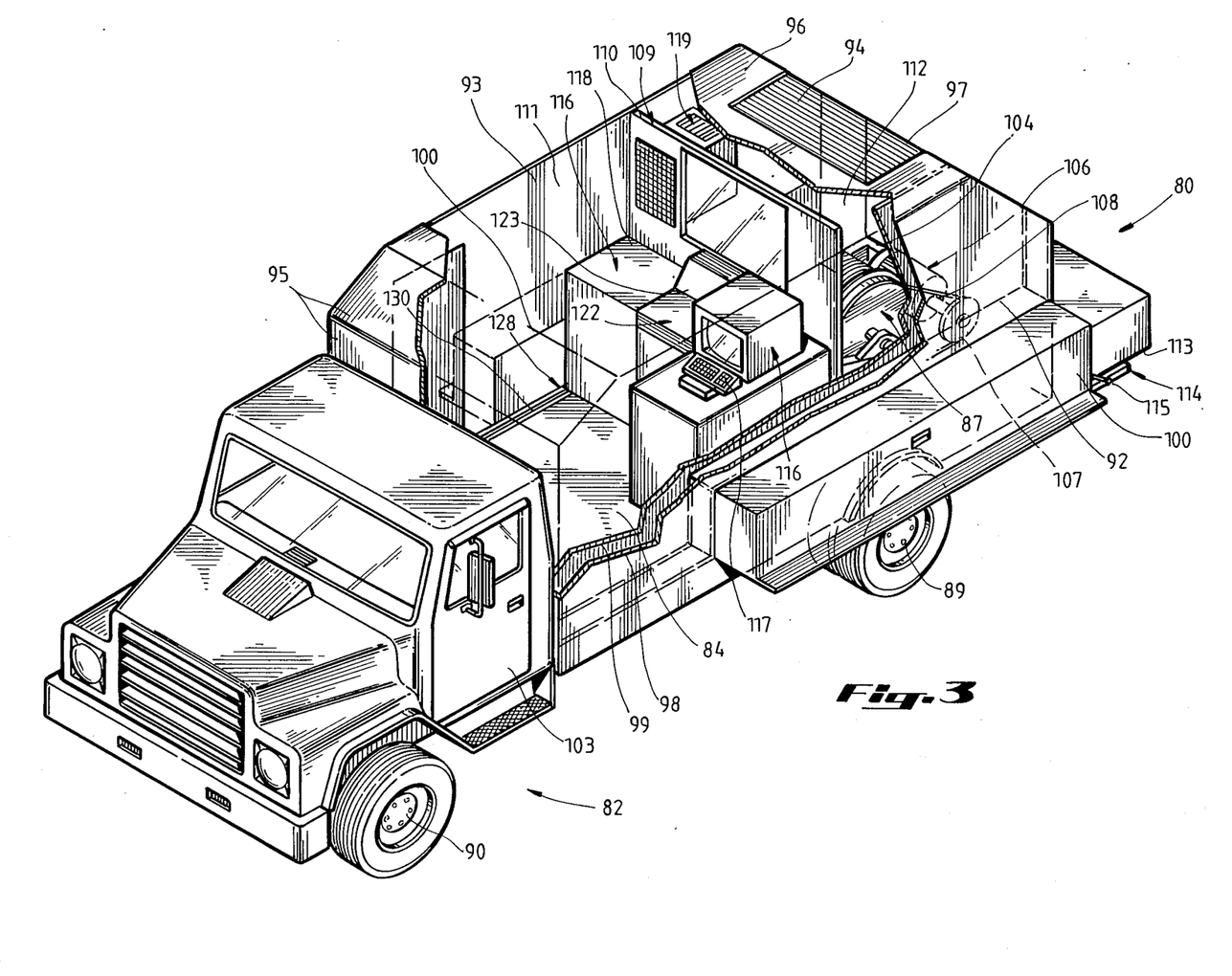
FIG. 3 is a partial, cut-away, perspective view of the well-logging laboratory, in accordance with the present invention, the components thereof being shown in their well-logging operations position.

With reference to FIGS. 3 and 4, it is seen that frame 86 and drum 87 have been moved within outer shell 85 by frame moving means 88, to be hereinafter described in greater detail. Drum 87 is disposed toward the rear of outer shell 85, whereby drum 87 is able to rotate to raise or lower wireline 81 within a borehole (not shown) in order to conduct well-logging operations with a well-logging tool (not shown) suspended within the borehole (not shown) by wireline 81.

With reference now to FIGS. 1, 2 and 5, support surface 84 may be a single flat plate member 91 which forms a base, or floor, for the space defined by outer shell 85. Alternatively, a plurality of plate members 91, or any other suitable structure, could be utilized to form support surface 84. Plate member 91 can be manufactured of any suitable material having the requisite strength characteristics as to be able to support the weight of drum 87 and the other components of well-logging laboratory 80, as will hereinafter be described in greater detail. Preferably, plate member 91 is manufactured from any suitable steel. Additionally, conventional reinforcing can be supplied to support surface 84, in a conventional manner.

Outer shell 85 may preferably comprise a plurality of wall surfaces 92-96, which wall surfaces 92-96 form the outer shell 85 to define an enclosed area within which the drum 87 and other equipment, to be hereinafter described, are disposed. The top and back wall surfaces 96 and 94 may be provided with a conventional sliding door 97 disposed therein, which upon being opened permits ready access to the drum 87 and wireline 81. As should be readily understood to one of ordinary skill in the art, the shape of outer shell 85, as defined by wall surfaces 92-96, could be any shape desired, as well as could be made of numerous types of material. In this regard, wall surfaces 92-96 could be made of any suitable metallic or plastic material having the requisite strength characteristics. Further, the top wall surface 96 could be made of canvas, or a canvas-like material, which can prevent the elements from entering the interior of outer shell 85 when door 97 is closed.

With reference to FIGS. 1-5, it is seen that one of the wall surface 92 may have a double wall construction such as shown at 98, 99 to provide rigidity to the outer shell 85 construction. Additionally, slide-out tool storage boxes 100, 101, may be provided in wall surfaces 92, 93. Additionally, as seen in FIG. 5, a plurality of well-logging tool storage compartments 102 may be associated with support surface 84. Preferably, the well-logging tool storage compartments are disposed beneath the support surface 84 and extend at least along a portion of the length of the support surface 84. Further, if desired, the well-logging tool storage compartments 102 can extend from the rear of support surface 84 toward the cab 103 of truck 82, and extend beneath cab 103, so as to provide additional storage space for the well-logging tools, which can be as long as 20 feet.

With reference to FIGS. 2, 4, and 5, frame 86 includes at least one first frame member 104 which is disposed substantially parallel with respect to the support surface 84, and drum 87 is mounted to the at least one parallel first frame member 104. Preferably, frame 86 includes a plurality of frame members 104, which form a rectangular-shaped support structure which is disposed in a plane substantially parallel to the support surface 84. Drum 87 may be rotatably mounted to frame members 104 as by shafts 105 rotatably received within two of the first parallel frame member 104. A drive unit 106 for rotating drum 87 may be associated with drum 87, and the drive unit 106 may be associated with the at least one parallel first frame member 104. Preferably, drive unit 106 is rotatably mounted within frame 86, as by being rotatably received by one of the parallel frame members 104 and auxiliary frame members 104'. Preferably, drive unit 106 provides rotation to a sprocket, or pulley, 107 which in turn rotates drum 87 via a chain, or belt, 108. Drive unit 106 may be electrically, mechanically, or hydraulically operated such as by a combustion engine, electric motor, etc.; however, it is preferred that drive unit 106 be hydraulically operated and obtain its power from a conventional power take-off device (not shown) which is driven from the gear box (not shown) of truck 82, which in turn operates drive unit 106.

As shown in FIGS. 1-5, frame 86 may also include at least one second frame member 109 which is disposed substantially perpendicular to the support surface 84, and is disposed within the outer shell 85. Preferably, the at least one second perpendicular frame member 109 comprises a bulkhead 110 associated with the at least one parallel first frame member 104. Bulkhead 110 is adapted to divide the enclosed area within the outer shell 85 into a first and a second compartment 111, 112. The size of each compartment 111, 112, is thus determined by the location of the bulkhead 110 within the outer shell 85, dependent upon the relative movement of the bulkhead 110 with respect to the support surface 84. Thus, as previously described, upon movement of frame 86, bulkhead 110, as shown in FIGS. 3, 4, and 5, forms a first compartment 111, or logging instrument cabin, and a second compartment, 112, or drum cabin. Thus, there is adequate space within the logging instrument cabin 111 to permit the operators to operate the equipment disposed therein, as will be hereinafter described in greater detail. The location of bulkhead 110, shown in FIGS. 3, 4, and 5, would be after the point in time when the well-logging laboratory has arrived at the site of the borehole, and it is desired to begin well-logging operations.

In FIGS. 1 and 2, bulkhead 110 has been moved forward toward the truck cab 103, whereby the first compartment, or logging instrument cabin, 111, is smaller; however, the second compartment, or drum compartment, 112, is larger. Bulkhead 110 is disposed in the position shown in FIGS. 1 and 2 during the transportation stage of well-logging lab 80 to the desired borehole site. As seen in FIG. 2, additional equipment utilized in well-logging operations, such as pressure control equipment, may be stored during transport in the second compartment. Such equipment is schematically illustrated as a large box 113. As seen in FIGS. 2 and 5, compartment 112 may include a means for removing 114 the equipment 113. Preferably, the equipment moving means 114, comprises a hydraulically operated moveable platform 115. Upon well-logging laboratory 80 reaching the desired borehole site, the equipment 113 that has been stored in the drum compartment 112, as shown in FIGS. 1 and 2, may be easily and readily removed from the drum compartment 112, prior to the movement of bulkhead 110 and drum 87 into the positions shown in FIGS. 3 and 4.

As shown in FIGS. 1-5, drum 87 is disposed within the second compartment, or drum cabin, 112, and a computer 116 for use with the well-logging tool (not shown) is disposed within the first compartment, or instrument cabin 111. Computer 116 may preferably include a computer console and related instrumentation 118. Preferably, computer 116 is attached, or fixedly secured, to the bulkhead 110, and moveable therewith. Accordingly, upon movement of the frame 86 with respect to support surface 84, the drum 87 and computer 116, simultaneously move with the frame 86, because of the attachment of computer 116 to the bulkhead 110 which forms a part of frame 86.

Still with reference to FIGS. 1-6, at least one air conditioning unit 119 is associated with the logging instrument cabin 111 in order to provide cool air to the first compartment 111, or logging instrument cabin. Preferably, the at least one air conditioning unit 119 is attached to the bulkhead 110 and moveable therewith. A means for sealing 120 the bulkhead 110 with respect to the interior of the outer shell 85, or the interior or wall surfaces 92-96, may be provided, whereby the passage of uncooled air from the second compartment 112, or drum compartment, to the first compartment 111, or logging instrument cabin, is substantially prevented. Sealing means 120 can be of any suitable type so as to achieve the desired purpose. For example, as shown in FIGS. 1-5, bulkhead 110 could be sized to closely conform and be in sliding engagement with the interior of the outer shell 85, whereby the desired sealing is obtained. Alternatively, an inflatable seal 121 (FIG. 1) could be disposed about the periphery of bulkhead 110, and upon the movement of bulkhead 110 into its desired location for well-logging operations, as shown in FIG. 4, seal 131 could be inflated to provide the desired sealing. As seen in FIGS. 1-5, a control means 122 for operating the drum 87 may be disposed within the logging instrument cabin 111. Preferably, the drum control means 122 is attached, or fixedly secured, to the bulkhead 110 and moveable therewith. Drum control means 122 can be any suitable control console 123, and includes the requisite connections (not shown) between drum 87 and drive unit 106.

With reference to FIG. 6, a well-logging laboratory 80 for use on an offshore structure 83 is shown. The construction of well-logging laboratory 80 of FIG. 6 may be identical to that previously described in connection with FIGS. 1-5 for a well-logging laboratory which may be transported by truck 82 to a borehole site. Additionally, the well-logging laboratory 80 of FIG. 6 may include means for moving 124 the support surface 84 with respect to the offshore structure 83. As shown in FIG. 6, the moving means 124 may comprise at least one roller 125 associated with support surface 84 and the offshore structure 83. Preferably, a plurality of rollers 125 are disposed within a plurality of box-shaped brackets 126 secured to support surface 84, and the rollers engage a rail 127 disposed upon the offshore structure 83. As shown in FIG. 6, rail 127 is of a generally circular shape, in that the typical derrick (not shown) disposed upon an offshore platform 83 rotates with respect to the platform, and in turn it is desirable for the well-logging laboratory 80 to rotate in the same fashion.

Figure 7:
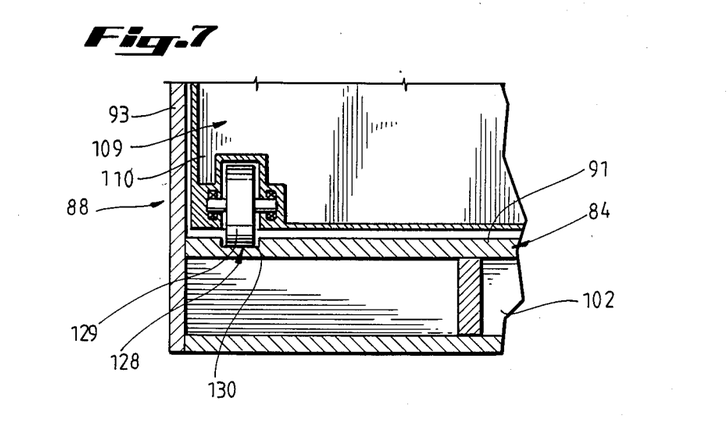
FIG. 7 is a partial, cross-sectional view taken along line 7—7 of FIG. 6.

With reference to FIGS. 5, 6 and 7, it is seen that the frame moving means 88 may include at least one rail 128 associated with the support surface 84 and the frame 86. Preferably, frame moving means 88 also includes at least one roller 129 associated with frame 86. As seen in FIGS. 5-7, a plurality of rollers 129 are associated with frame 86 and two rails 128, or longitudinal grooves 130 disposed in support surface 84, are illustrated. It should be readily apparent to one of ordinary skill in the art that any suitable means could be utilized for moving frame 86 with respect to support surface 84. In addition to the structure illustrated in FIGS. 5-7, frame 86 could be mounted upon a monorail structure associated between frame 86 and support surface 84. Frame 86 could be moved by merely pushing against bulkhead 110, or frame members 104. Alternatively, a conventional power source could be utilized to provide the desired motion of frame 86 with respect to support surface 84. Rails 128 could be raised with respect to support surface 84, or be formed as grooves 130 as shown in FIGS. 5-7. Additionally, rails could be associated with frame 86, and the rollers could be disposed within support surface 84. Additionally, a false floor using a conveyor type drive could be utilized to move frame 86 with respect to support surface 84. Additionally, a gear driven screw drive could be utilized to move frame 86 with respect to support surface 84. In order to prevent undesired movement of frame 86 with respect to support surface 84, any suitable, conventional type of locking means could be provided to lock frame 86 with respect to support surface 84, such as during transportation of well-logging laboratory 80 to its desired location, or during the performance of well-logging operations.

It should be noted that if repairs are necessary to any of the components of the well-logging laboratory, and particularly those components which may be fixedly secured to frame 86, such as drum 87, drive unit 106, computer 116, drum control means 122, or air conditioning unit 119, all these components can be completely removed from outer shell 85 as a modular unit. In this regard, bulkhead 110 could be provided with conventional lifting eyes (not shown) whereby the frame 86 could be moved outwardly of outer shell 85 and a suitable lifting device could be engaged to the lifting eyes to remove the frame 86 and its attached components, as a modular unit. A new frame 86, with all the components attached thereto, could then be lifted into outer shell 85. Thus, in the embodiment when well-logging laboratory 80 is moved by truck 82, it is not necessary for the entire truck 82 to sit idle. Rather, another modular frame 86 with new components attached thereto is inserted into the outer shell 85 carried by truck 82.

In the context of a well-logging laboratory 80 disposed upon an offshore structure, as shown in FIG. 6, once the outer shell 85 and support surface 84 are disposed upon the offshore structure 83, all that is necessary to complete the well-logging laboratory 80 is to dispose the frame 86, with its components attached thereto, as a modular unit into outer shell 85. Further, it is not necessary to have another structure disposed upon the offshore structure 83, in that the well-logging laboratory 80 of the present invention, as shown in FIG. 6, provides adequate storage space for the necessary equipment to conduct well-logging operations at an offshore location.

It should be noted that bulkhead 110 could be disposed upon a separate frame from that which the drum is mounted to, whereby the bulkhead could be moveable as a separate unit with respect to the drum mounted on the frame. Thus, many of the foregoing described advantages could still be achieved, but it would be necessary to have the bulkhead independently moveable with respect to the frame upon which the drum is mounted.

It is to be understood that the invention is not limited to the exact materials of construction, operation, exact materials or embodiment shown and described, as obvious modifications and equivalents will be apparent to one skilled in the art; for example, the means for transporting the support surface, outer shell, frame, drum, and frame moving means to a borehole could be a large trailer which may be towed by a truck and then disengaged by the truck. Accordingly, the invention is therefore to be limited only by the scope of the appended claims.

I claim:

1. A transportable well-logging laboratory, for use with a well-logging tool which is suspended within a borehole by a wireline, comprising:
   a support surface having first and second ends;
   an outer shell associated with the support surface and defining an area therewithin;
   a frame associated with the support surface and disposed within the outer shell, the frame being moveable between a first position and a second position within the outer shell, the first position being disposed away from the first end of the support surface, and the second position being disposed adjacent the first end of the support surface;
   a drum mounted to the frame and disposed within the outer shell, the drum being adapted for having the wireline disposed thereon and adapted for moving the wireline within the borehole when the frame and drum are disposed in the second position adjacent the first end of the support surface;
   means for moving the frame with respect to the support surface and within the outer shell and between the first and second positions, whereby the drum is moveable upon the support surface along at least a portion of the length of the support surface, and the drum is operable to move the wireline within the borehole when the frame and drum are disposed in the second position adjacent the first end of the support surface;
   a moveable, substantially vertical bulkhead disposed within the outer shell; the bulkhead dividing the area within the outer shell into a first and second compartment, the size of each compartment being determined by the location of the bulkhead within the outer shell, upon relative movement of the bulkhead, with respect to the support surface; and
   means for moving the bulkhead within the outer shell.

2. The laboratory of claim 1, wherein the frame moving means includes at least one rail associated with the support surface and the frame.

3. The laboratory of claim 2, wherein the frame moving means includes at least one roller associated with the rail.

4. The laboratory of claim 1, wherein the frame includes at least one first frame member disposed substantially parallel with respect to the support surface, and the drum is mounted to the at least one parallel first frame member.

5. The laboratory of claim 4, wherein a drive unit for rotating the drum is associated with the drum, and the drive unit is associated with the at least one parallel first frame member.

6. The laboratory of claim 4, wherein the frame includes at least one second frame member disposed substantially perpendicular to the support surface and within the outer shell.

7. The laboratory of claim 6, wherein, the at least one second perpendicular frame member comprises the bulkhead, and the means for moving the bulkhead is the means for moving the frame, whereby the drum and bulkhead may be simultaneously moveable within the outer shell.

8. The laboratory of claim 1, including a means for sealing the bulkhead with respect to the interior of the outer shell, whereby the passage of air between the first and second compartments is substantially prevented.

9. The laboratory of claim 1, wherein the drum is disposed within the second compartment defined by the bulkhead, and a computer for use with the well-logging tool is disposed within the first compartment defined by the bulkhead.

10. The laboratory of claim 9, wherein the computer is attached to the bulkhead and moveable therewith, whereby upon movement of the frame with respect to the support surface, the drum and computer simultaneously move with the frame.

11. The laboratory of claim 9, wherein at least one air conditioning unit is associated with the first compartment to provide cool air to the first compartment.

12. The laboratory of claim 11, wherein the at least one air conditioning unit is attached to the bulkhead and moveable therewith.

13. The laboratory of claim 12, including a means for sealing the bulkhead with respect to the interior of the outer shell, whereby the passage of uncooled air from the second compartment to the first compartment is substantially prevented.

14. The laboratory of claim 1, whereby the drum is disposed within the second compartment defined by the bulkhead; and a control means for operating the drum is disposed within the first compartment defined by the bulkhead.

15. The laboratory of claim 14, wherein the drum control means is attached to the bulkhead and moveable therewith.

16. The laboratory of claim 1, wherein one of the compartments includes a means for moving equipment into and out of the compartment.

17. The laboratory of claim 16, wherein the equipment moving means comprises a hydraulically operated moveable platform associated with the support surface.

18. The laboratory of claim 1, including at least one well-logging tool storage compartment associated with the support surface.

19. The laboratory of claim 18, wherein the at least one well-logging tool storage compartment is disposed beneath the support surface and extends at least along a portion of the length of the support surface.

20. The laboratory of claim 1, wherein the support surface includes means for transporting the support surface, outer shell, frame, drum and frame moving means to a borehole.

21. The laboratory of claim 20, wherein the support surface transport means is a truck upon which the support surface is attached whereby the support surface, outer shell, frame, drum and frame moving means may be transported to a borehole.

22. The laboratory of claim 1, wherein the support surface includes means for moving the support surface with respect to an offshore structure associated with a borehole disposed beneath a body of water.

23. The laboratory of claim 22, wherein the support surface moving means comprises at least one roller associated with the support surface and offshore structure.

24. The laboratory of claim 1, wherein the bulkhead is disposed on a bulkhead frame associated with the support surface, whereby the bulkhead may be moveable independent of the drum within the outer shell.

* * * * *